| United States Patent [19] | [11] | 4,058,649 |
|---|---|---|
| Steiner | [45] | Nov. 15, 1977 |

[54] COATING COMPOSITIONS AND THERMOPLASTIC FILM SUBSTRATES COATED THEREWITH

[75] Inventor: Robert Henry Steiner, Rochester, N.Y.

[73] Assignee: Mobil Oil Corporation, New York, N.Y.

[21] Appl. No.: 506,075

[22] Filed: Sept. 23, 1974

Related U.S. Application Data

[63] Continuation of Ser. No. 189,743, Oct. 15, 1971, abandoned, which is a continuation-in-part of Ser. No. 16,211, March 3, 1970, abandoned.

[51] Int. Cl.$^2$ .............................................. C08J 7/04
[52] U.S. Cl. .............................. 428/518; 260/28.5 D; 260/29.6 TA; 428/520; 428/910
[58] Field of Search ............... 260/28.5 D, 29.6 T, 260/29.6 TA; 428/518, 910

[56] References Cited

U.S. PATENT DOCUMENTS

| 3,041,208 | 6/1962 | Hay | 428/518 |
|---|---|---|---|
| 3,309,330 | 3/1967 | Settlage | 260/29.6 TA |
| 3,362,841 | 1/1968 | Menikheim | 260/29.6 TA |
| 3,387,997 | 6/1968 | Sculley | 260/29.6 TA |
| 3,397,163 | 8/1968 | Bruno | 260/28.5 D |

Primary Examiner—Paul R. Michl
Attorney, Agent, or Firm—Charles A. Huggett; James D. Tierney

[57] ABSTRACT

A multipolymer coating composition particularly adapted for coating thermoplastic film substrates, comprising an interpolymer of (a) vinylidene chloride, (b) an alkyl acrylate such as methyl acrylate and (c) methacrylic acid or mixtures thereof with acrylic acid.

4 Claims, No Drawings

COATING COMPOSITIONS AND THERMOPLASTIC FILM SUBSTRATES COATED THEREWITH

CROSS REFERENCE TO RELATED APPLICATIONS

This is a continuation of application Ser. No. 189,743, filed Oct. 15, 1971, now abandoned, which latter application was a continuation-in-part of U.S. application Ser. No. 16,211, filed Mar. 3, 1970, now abandoned.

BACKGROUND OF THE INVENTION

I. Field of the Invention

The present invention relates to coating compositions adapted for application to film substrate materials such as therm plastic films, for example, polyolefin films such as polyethylene, polypropylene, polybutene, copolymers thereof and the like; polyester films such as, for example, polyethylene terephthalate, whereby certain properties of such coated films are improved. Specifically, uncoated polyolefin films such as oriented polypropylene for example, have an extremely narrow heat seal range, whereby such uncoated films exhibit a tendency to disorient and shrink when attempts are made to heat seal such films. The coating compositions of the present invention, when applied to such a substrate film, improve the heat seal properties thereof by broadening the heat seal range and lowering the minimum heat seal temperature requisiste to achieve satisfactory seals. Additionally, the coating compositions of the present invention improve the resistance of films coated therewith to the transmission of gases and vapors. The coated films exhibit excellent optical properties and may be readily heat sealed to other films such as polymer coated cellophane and the like.

II. Description of the Prior Art

The prior art discloses that multipolymers characterized by having a high vinylidene chloride content can be used advantageously as surface coatings for thermoplastic films such as, for example, oriented polypropylene films. As hereinbefore noted, these coatings contribute improved heat sealability, excellent optical properties, improved resistance to the transmission of gases and vapors, and heat sealability to coated cellophane for example.

In the past, such coating compositions have been applied to film substrates utilizing two basic coating application techniques: (1) coating from a solution of a high vinylidene chloride content multipolymer and a suitable organic solvent and (2) coating utilizing a dispersion or latex of discrete polymer particles of roughly 0.01 to 1 micron in diameter in water, such particles being stabilized by surface active agents.

The major advantage of the organic solvent coating technique, i.e. solution coating, is the case of film coating formation. Since the polymers are mono-molecularly dispersed in a suitable solvent, coherent films, i.e. coatings with relative freedom from voids ("pinholes") are formed by intermingling of the molecules as the solvent evaporates on drying. However, the disadvantages of such solution coating techniques are many and varied. Suitable organic solvent systems for high vinylidene chloride content multipolymers are relatively expensive and quite flammable. Solvent recovery systems are necessarily a requisite for economical operation with such coating systems. Further, unless very low molecular weight polymers are used, only dilute, i.e. on the order of about 20% solids, solutions can be employed because of the processing problems which would otherwise be encountered with the high molecular weight - high viscosity polymer solutions. Furthermore, high vinylidene chloride content multipolymers tend to retain solvents tenaciously, thus requiring extensive drying times for anything except extremely thin coating layers. U.S. Pat. No. 3,397,079 contains a disclosure relating to the employment of an organic solvent coating technique for this type of multipolymer system.

The latter type of coating system referred to hereinabove i.e. an aqueous dispersion or latex coating system, is disclosed in U.S. Pat. No. 3,459,582. A latex, by definition, is a dispersion of spherical, polymeric particles in the range of from about 0.01 up to about 1.0 micron (0.004 – 0.04 mils) diameter in water. Latex coating systems employed for coating application to film substrates generally consist of from about 50% to about 60% solids with about 2% to 3% of the solids being wetting and suspending agents. On drying the applied coating, the water evaporates and the particles fuse together at their contacting surfaces. By the very nature of such a latex coating process, only relatively thick coatings can be obtained. Conversely, when attempts are made to apply relatively thin coatings from a latex media, i.e. on the order of about 0.05 mils or less, such coatings are usually characterized by minute voids or pinholes therein and, additionally, commercially prohibitive, long baking must be employed. Additionally, it is not usually practical, due to the difficulties of obtaining uniform dispersion, to add any substantial amount of modifier ingredients to the latex coating system such as, for example, hot slip additives and other polymers.

SUMMARY OF THE INVENTION

In accordance with the present invention, applicant has been able to overcome the hereinbefore discussed disadvantages of the coating systems disclosed in the prior art as a result of the development of a novel multipolymer resin composition which may be applied to thermoplastic film substrates without the employment of organic solvents or utilization of aqueous latex dispersions. In general, applicant has found that by synthesizing a multipolymer containing a predominance of vinylidene chloride; a copolymerizable acid monomer such as methacrylic acid or a mixture of methacrylic and acrylic acid which mixtures contain a predominance, i.e. at least 50% or more by weight of methacrylic acid; and a monomer such as alkyl acrylates, methacrylates and acrylonitrile, for example, the disadvantages of the prior art coating systems may be overcome. Applicant's multipolymer, which may be prepared as a latex by an emulsion polymerization technique, can be converted to an aqueous polymer solution by the addition of aqueous ammonia. Although high vinylidene chloride content polymers are unstable in the presence of aqueous ammonia because of the strong tendency toward dehydrochlorination, applicant has found that by limiting the ammonia to about 75% of the theoretical amount required to neutralize the acid component of the multipolymer, excellent coatings can be applied and dried on film substrates with essentially no discoloration.

In particular, applicant's novel coating compositions which, as hereinbefore discussed, are particularly adapted for use in coating polyolefin substrates such as oriented polypropylene, contain as a film forming component a resin consisting essentially of an interpolymer of (a) from about 5% to about 15% by weight of an α-β monoethylenically unsaturated acid selected from the group consisting of methacrylic acid and mixtures of methacrylic acid and acrylic acid wherein the methacrylic acid is present in such mixtures in amounts of at least about 50% by weight based on the total weight of said mixture; and (b) from about 50% to a 85% by weight of vinylidene chloride; and (c) from about 0% to about 45% by weight of an alkyl acrylate such as, for example, methyl acrylate, ethyl acrylate, butyl acrylate and the like, methyl acrylate being the preferred alkyl acrylate; or 0 – 45% by weight of an alkyl methacrylate such as methyl, ethyl or butyl methacrylate, for example; or acrylonitrile or methacrylonitrile.

DESCRIPTION OF SPECIFIC EMBODIMENTS

In order to more clearly characterize the multipolymer compositions of the present invention, the following is a description of the specific type of monomer components that are employed to produce applicant's multipolymer compositions.

1. Vinylidene Chloride ($VCl_2$) Monomer Component

It has been found that the vinylidene concentrations in the multipolymer compositions may be varied as hereinbefore discussed from about 50% by weight to about 85% by weight based upon the total weight of the multipolymer. The rate of oxygen transmission through base films coated with multipolymers containing varying levels of vinylidene chloride is inversely related to the vinylidene chloride content of the multipolymer. For packaging applications where relatively high barrier properties are desired, a coating polymer with at least about 80% vinylidene chloride is required. Conversely, the vinylidene chloride level in the multipolymer may be as low as about 50%. Such coatings result in good heat seal strength characteristics for the coated film and, although the oxygen barrier properties are not as high as in the case of the multipolymers containing higher levels of vinylidene chloride, the barrier properties are still far superior to those exhibited by an uncoated substrate film such as, for example, uncoated oriented polypropylene.

2. Acid Monomer Component

It is desirable that the acid monomer level in applicant's multipolymer compositions be kept at the minimum required to confer ammonia solubility on the resulting polymer. It has been found that if the acid level is considerably higher than the desired minimum, the viscosity of the ammonia water solution of the multipolymer becomes too high for application of such coatings utilizing conventional techniques such as gravure coating for example, and, additionally, the moisture sensitivity of the dry coating on the film substrate is adversely affected. It has been found that the optimum acid levels in the multipolymer compositions will vary depending upon the concentration of the vinylidene chloride monomer content of the total multipolymer and the nature of the third monomer component such as, for example, the alkyl acrylate component of the multipolymer. Applicant has found that when employing methyl acrylate (MA) as the third monomer component, the following ranges of acid concentration in the multipolymer result in satisfactory coating compositions.

| Vinylidene Chloride Content | Acid Content |
|---|---|
| 50% | 5 – 9% |
| 65% | 6 – 12% |
| 80% | 7 – 15% |

As hereinbefore discussed, wither methacrylic acid or mixtures of methacrylic acid and acrylic acid may be employed as the acid moiety in the multipolymer. In the latter case, it has been found that the acrylic acid (AA) concentration by weight may not be greater than the weight concentration of the methacrylic acid when such mixtures are employed. Applicant has found that if the acid moiety consists of only acrylic acid or mixtures thereof with methacrylic acid (MAA) wherein the acrylic acid is present in amounts over 50% by weight, the resulting multipolymer is not completely soluble in ammonia water.

3. Acrylate Monomer Component

The acrylate monomer is employed in the multipolymer compositions of the present invention to improve the heat sealability of the resultant coating. Thus, applicant has found that a multipolymer consisting of 85/15% by weight of vinylidene chloride ($VCl_2$) and methacrylic acid (MAA) respectively, when coated upon a thermoplastic film substrate, results in minimal acceptable heat seal values in contrast to, for example, an 80/10/10-vinylidene chloride/methacrylic acid/methyl acrylate multipolymer, which multipolymer exhibits improved heat seal properties. Several alkyl acrylate monomers may be employed as the alkyl acrylate component or the multipolymer, including alkyl acrylates such as, for example, methyl, ethyl, butyl, isobutyl, and octyl acrylates. However, methyl acrylate (MA) has been found to be a preferred alkyl acrylate in the present coating composition.

Preferred concentrations of the alkyl acrylate component in the multipolymer coating compositions have been found to be from about 5% by weight up to about 45% by weight, and more preferably from about 5% up to about 20% by weight, based upon the total weight of the multipolymer.

4. Molecular Weight of Multipolymer

In order to produce a relatively high solids content, ammonia water solution of the hereinbefore described multipolymers, with satisfactory viscosity for coating operations, it is desirable to regulate their molecular weight by incorporating chain transfer agents in the polymerization formula. Effective chain transfer agents, well known in the art, include alkyl mercaptans, esters of 2-mercaptoacetic acid, halogenated hydrocarbons and other materials as described, for example, in *Encyclopedia of Polymer Science and Technology*, Interscience Publishing Co., N.Y.C., Vol. 3, pp. 575–610 (1965). Ethyl mercaptoacetate has been found to be especially suitable and may be included in the polymerization formulation in a ratio of 0.05 to 1.50 parts per hundred parts of monomer. More specifically, ratios of 0.1 to 1.0 are effective. The resulting multipolymers exhibit intrinsic viscosities, as measured in tetrahydrofuran solution as 25° C., of less than about 0.50.

5. Compounding of Coating Additives with the Basic Multipolymer

It is desirable that the ammonia water solutions of the polymers hereinbefore discussed be compounded with specific additives to achieve a balance of properties needed for a useful packaging film.

As is known in the art, waxes may be utilized in film coating compositions. Waxes having melting points from about 55° C. to about 100° C. are particularly preferred. A wide variety of such waxes have been found suitable such as, for example, microcrystalline hydrocarbon waxes, candellila waxes, paraffin wax, beeswax, carnauba wax, japan wax, montan wax, etc. and synthetic waxes such as hydrogenated castor oil, chlorinated hydrocarbon waxes, long chain fatty acid amides, etc. When carnauba wax is employed in such coating compositions, it has been found that from about 2 to about 10 parts by weight based upon the total weight of the multipolymer may be advantageously employed in the form of an aqueous dispersion having an average particle size of about 0.1 micron. A particularly preferred concentration of wax particles has been found to be about 5 parts per 100 parts of polymer.

The multipolymer compositions of the present invention which contain relatively high amounts of vinylidene chloride, i.e. on the order of from about 75% up to about 85% by weight, result in coated films which exhibit good frictional properties, i.e. films where the coefficient of friction is not so high as to make films inoperable on automatic packaging equipment. However, it has been found desirable in certain instances to add small amounts of finely divided, insoluble materials to further lower the coefficient of friction of such coated films to the low values requisite for high-speed packaging operations. From about 0.1 to about 1.0 parts per 100 parts of polymer of finely divided material such as talc, clay, polyvinyl chloride resin, silica, mica and the like may be used. Applicant has found that a preferred formulation is one which contains about 0.25 parts per 100 parts of polymer, of talc having an average particle diameter of about 2 microns.

The following example illustrates a specific emulsion polymerization technique which may be employed to produce the novel multipolymer coating compositions of the present invention.

EXAMPLE 1

A 2000 ml. flask equipped with a stirrer, thermometer, condenser, gas inlet tube, and a calibrated dropping funnel was charged with 1200 grams of demineralized water and 3.0 grams of purified sodium dodecyl sulfate. A slow stream of nitrogen was admitted with stirring while the aqueous solution was heated to about 50° C. The following materials were mixed and placed in the dropping funnel.

| | | |
|---|---|---|
| (a) | vinylidene chloride | 480 grams |
| (b) | methyl acrylate | 60 grams |
| (c) | methacrylic acid | 60 grams |
| (d) | ethyl mercaptoacetate | 3.3 grams |

With continued heating, 1.8 grams of ammonium persulfate was added to the aqueous system. When completely dissolved, 0.9 grams of sodium bisulfite was added. When the temperature reached 55° C., the nitrogen stream was discontinued and a slow continuous addition of the monomer mixture was started. Heat was supplied as needed to maintain a reaction temperature of about 55° ± 1° C. with a moderate degree of refluxing. An addition rate of about 100 grams per hour was found to be satisfactory. When all of the monomer was added, stirring and heating was continued for one hour, at which time heating was discontinued and the mixture was allowed to cool to room temperature. The latex was screened through a coarse filter to remove large particles of precoagulum. The product had a solids content of about 32.5 ± 0.5% and had an opalescent, fluid appearance. On mixing a small quantity of latex with an equal volume of 6% ammonia water and warming to about 60° C., a clear yellowish viscous solution was obtained. A portion of the latex dried at room temperature had an intrinsic viscosity of about 0.17 as measured in tetrahydrofuran solution at 25° C.

In the following Table 1, the multipolymer prepared in accordance with Example 1, i.e. a multipolymer comprising $VCl_2$ (80% by weight), MA (10% by weight), and MAA (10% by weight) with an intrinsic viscosity of 0.17 was compounded with 5 phr carnauba wax and 0.25 phr talc and applied from an ammoniacal aqueous solution to the surface of a biaxially oriented polypropylene film, approximately 0.75 mils thick. The surface of the oriented film had been subjected to a conventional corona discharge treatment and primed with a commercially available water based adhesive designed for treated polyolefin films, identified by the manufacturer as Accobond 1094, a cross-linked acrylic compound. A prime coating of 0.1 gm./1000 in.$^2$ was used.

The variations in coating weights were achieved by conventional coating techniques well known to the art, e.g. by varying the solids content of the coating mixture from 15 to 25% and using gravure applicator rolls of various cell size.

Samples of the coated films were heat sealed together utilizing both a low pressure heat seal and a crimp heat seal. The low pressure heat seals and the crimp heat seals were made as follows:

Low Pressure Heat Seal Test

The low pressure heat seal test is designed to simulate conditions under which films might be sealed in a typical overwrapping machine. Strips of film are cut, 1 × 10 inches, with the long direction being in the machine direction of the film. Two strips of film are superimposed with coated surfaces in contact and placed in a heat-sealing machine with one movable heat-sealing platen. On actuation, the heated platen rises, contacts the underside of the film assembly and lifts it against a superimposed weight for a controlled period of time. The weight used is ¼ pound over a 1 square inch area and the time of contact is 2 seconds. Five separate seals are made on each strip of film. After conditioning for 4 hours at 75° F. and 50% relative humidity, strengths are determined by placing the free ends of the film in the jaws of a Suter testing machine and peeling the seals apart at a rate of 20 inches per minute. The maximum force in grams is recorded as the heat seal strength.

Crimp Heat Seals

The crimp seal test is designed to simulate conditions encountered in a form-and-fill bag-making machine. Two heated platens with serrated surfaces are brought together by air pressure at 10 pounds per square inch on either side of the film strips for ¾ second, then separated. Testing of the seals is carried out as above.

TABLE I

| Examples | Coating Weight gms/1000 in.²/side | Low Pressure Heat Seal (¼ psi, 2 secs.) | | | Crimp Heat Seal (10 psi, ¾ sec.) | | |
|---|---|---|---|---|---|---|---|
| | | 210° F. | 230° F. | 250° F. | 210° F. | 230° F. | 250° F. |
| (1) | 0.57 | 17 g/in. | 140 g/in. | 198 g/in. | 198 g/in. | 256 g/in. | 316 g/in. |
| (2) | 0.79 | 13 g/in. | 123 g/in. | 212 g/in. | 215 g/in. | 283 g/in. | 329 g/in. |
| (3) | 0.87 | 13 g/in. | 163 g/in. | 223 g/in. | 238 g/in. | 321 g/in. | 356 g/in. |
| (4) | 1.06 | 25 g/in. | 168 g/in. | 220 g/in. | 264 g/in. | 296 g/in. | 341 g/in. |
| (5) | 1.40 | 8 g/in. | 140 g/in. | 237 g/in. | 244 g/in. | 341 g/in. | 418 g/in. |
| (6) | 1.70 | 27 g/in. | 152 g/in. | 232 g/in. | 271 g/in. | 363 g/in. | 400 g/in. |
| (7) | 1.98 | 14 g/in. | 145 g/in. | 262 g/in. | 344 g/in. | 428 g/in. | 499 g/in. |

The emulsion polymerization procedure described in Example 1 was repeated except that ethyl acrylate was employed as the third monomer in place of methyl acrylate. Data on typical coated films with various coating weights are presented in Table 1A.

TABLE IA

| Coating Weight gms/1000 in.²/side | Low Pressure Heat Seal (¼ psi, 2 secs.) | | | Crimp Heat Seal (10 psi, ¾ sec.) | | |
|---|---|---|---|---|---|---|
| | 210° F. | 230° F. | 250° F. | 210° F. | 230° F. | 250° F. |
| 0.81 | 7 g/in. | 40 g/in. | 147 g/in. | 200 g/in. | 308 g/in. | 390 g/in. |
| 1.03 | 9 g/in. | 57 g/in. | 157 g/in. | 204 g/in. | 339 g/in. | 413 g/in. |
| 1.77 | 7 g/in. | 92 g/in. | 183 g/in. | 271 g/in. | 341 g/in. | 400 g/in. |
| 1.95 | 5 g/in. | 120 g/in. | 208 g/in. | 268 g/in. | 325 g/in. | 416 g/in. |

The procedure described in Example 1 was repeated except that the following monomer mixture was used:

| | | Parts by Wt. |
|---|---|---|
| vinylidene chloride | 480 grams | 80 |
| n-butyl acrylate | 48 grams | 8 |
| methacrylic acid | 72 grams | 12 |

Data on typical coated films are presented in the following Table IB.

TABLE IB

| Coating Weight gms/1000 in.²/side | Low Pressure Heat Seal (¼ psi, 2 secs.) | | | Crimp Heat Seal (10 psi, ¾ sec.) | | |
|---|---|---|---|---|---|---|
| | 210° F. | 230° F. | 250° F. | 210° F. | 230° F. | 250° F. |
| 1.01 | 2 g/in. | 62 g/in. | 157 g/in. | 140 g/in. | 196 g/in. | 266 g/in. |
| 1.65 | 10 g/in. | 110 g/in. | 205 g/in. | 210 g/in. | 320 g/in. | 380 g/in. |

As shown in the preceding Tables I, IA and IB, strong heat seals may be obtained employing varied specific embodiments of the coating composition of the present invention at relatively low coating weights, i.e. as low as 0.57 grams/1000 in.²/side. Since the multipolymer was totally soluble in concentrated ammonia water, a solution, rather than latex, coating technique could be employed resulting in coherent coatings at very low coating weights which exhibited excellent heat seal properties as illustrated in Table I.

In the following Table II, a commercially available VCl₂ base latex, containing no acidic monomer component and identified by the manufacturer as latex CX2139, was compounded with 5 phr carnauba wax and 0.5 phr sodium oleate and 0.8 phr of a wetting agent identified by the manufacturer or Igepal CO-630 were added as wetting agents. The aqueous latex, which was not soluble in a concentrated aqueous ammonia water solution, was coated onto the surface of a biaxially oriented polypropylene base film, identical to the base film employed in Table I.

TABLE II

| Coating Weight gms/1000 in.²/side | Low Pressure Heat Seal (¼ psi, 2 secs.) | | | Crimp Heat Seal (10 psi, ¾ sec.) | | |
|---|---|---|---|---|---|---|
| | 210° F. | 230° F. | 250° F. | 210° F. | 230° F. | 250° F. |
| 0.8* | — | — | — | — | — | — |
| 1.1* | — | — | — | — | — | — |
| 1.32 | 8 g/in. | 35 g/in. | 132 g/in. | 119 g/in. | 265 g/in. | 313 g/in. |
| 1.56 | 8 g/in. | 100 g/in. | 118 g/in. | 184 g/in. | 223 g/in. | 275 g/in. |
| 1.70 | 27 g/in. | 152 g/in. | 232 g/in. | 271 g/in. | 363 g/in. | 400 g/in. |
| 2.03 | 13 g/in. | 198 g/in. | 258 g/in. | 323 g/in. | 365 g/in. | 443 g/in. |

*Very hazy, incoherent coating on film surface.

As shown by the data presented in the foregoing Table II, when attempts to form a satisfactory coating employing an aqueous latex were made, coherent clear coatings could not be obtained at coating weights below about 1.3 grams/1000 in.²/side and heat seal strengths were poor below a coating weight of about 1.5 grams/1000 in.²/side.

In the following Table III, a multipolymer was prepared utilizing the polymerization process described in U.S. Patent No. 3,397,163, comprising a vinylidene chloride/methyl acrylate/acrylic acid (80/20/4) multipolymer dispersion. A carnauba wax dispersion was compounded with the aqueous dispersion to give 5 phr wax solids based upon the total weight of the multipolymer solids. The multipolymer dispersion was not soluble in concentrated ammonia water, and was therefore applied to the surface of a biaxially oriented polypropylene base film, identical to the base film employed in Table I, as an aqueous latex.

TABLE III

| Coating Weight gms/1000 in.²/side | Low Pressure Heat Seal (¼ psi, 2 secs.) | | | Crimp Heat Seal (10 psi, ½ sec.) | | |
|---|---|---|---|---|---|---|
| | 210° F. | 230° F. | 250° F. | 210° F. | 230° F. | 250° F. |
| 0.63 | 0 g/in. | 5 g/in. | 27 g/in. | 61 g/in. | 141 g/in. | 265 g/in. |
| 0.78 | 0 g/in. | 3 g/in. | 40 g/in. | 52 g/in. | 161 g/in. | 311 g/in. |
| 0.89 | 0 g/in. | 0 g/in. | 10 g/in. | 42 g/in. | 126 g/in. | 261 g/in. |
| 1.07 | 24 g/in. | 123 g/in. | 300 g/in. | 161 g/in. | 340 g/in. | 395 g/in. |
| 1.41 | 11 g/in. | 135 g/in. | 290 g/in. | 174 g/in. | 355 g/in. | 471 g/in. |
| 2.10 | 21 g/in. | 145 g/in. | 320 g/in. | 220 g/in. | 404 g/in. | 510 g/in. |

As shown by the data presented in foregoing Table III, coherent coatings could be produced at relatively low coating weights, however, heat seals at moderate heat temperatures such as on the order of about 250° F. could not be obtained at coating weights below about 1.0 grams/1000 in.²/side. Obviously, for economic commercial application of such coatings on packaging films, it is desirable to use as low a coating weight as possible and also to obtain satisfactory heats at as low a temperature as possible.

Accordingly, from the data presented in the foregoing Tables, it will be apparent that applicant has now developed a vinylidene chloride base multipolymer coating system capable of being coated onto film substrates from an aqueous ammoniacal solution to provide excellent low temperature heat seal properties for film substrates at a minimum of coating weight.

As illustrated in the following Table IV, a number of the novel multipolymer coating compositions of the present invention were prepared utilizing the emulsion polymerization technique described in preceding Example 1. The precent by weight composition of the vinylidene chloride; methyl acrylate; and acid components of the multipolymer were varied to illustrate the affect of such variations on heat seal properties. The multipolymers were applied to the surface of oriented polypropylene films identical to those employed in preceding Table 1. As shown in Table IV, excellent heat seal properties were obtained with the multipolymer coating compositions even though the vinylidene chloride content of the multipolymer was varied in the range of from about 50 parts by weight up to about 85 parts by weight.

TABLE IV

| Composition | | | | Coating Weight g/1000 in.² | Low Pressure Heat Seal (¼ psi, 2 secs.) | | | Crimp Heat Seal (10 psi, ½ sec.) | | |
|---|---|---|---|---|---|---|---|---|---|---|
| VC | MA | MAA | AA | | 210° F. | 230° F. | 250° F. | 210° F. | 230° F. | 250° F. |
| 50 | 40 | 6.7 | 3.3 | 0.85 | 190 g/in. | 323 g/in. | 370 g/in. | 299 g/in. | 323 g/in. | 426 g/in. |
| 65 | 26 | 6 | 3 | 0.91 | 155 g/in. | 243 g/in. | 340 g/in. | 273 g/in. | 295 g/in. | 356 g/in. |
| 75 | 15 | 10 | 0 | 0.75 | 82 g/in. | 160 g/in. | 290 g/in. | 259 g/in. | 370 g/in. | 380 g/in. |
| 85 | 0 | 15 | 0 | 0.90 | 20 g/in. | 112 g/in. | 220 g/in. | 210 g/in. | 230 g/in. | 270 g/in. |

Other improved properties of the coated films of the present invention are illustrated in the following Table V wherein coated film samples identical to the film samples employed in Table I are compared with a commercially available, high vinylidene chloride content latex coated oriented polypropylene film identified by the manufacturer as CD-500. As shown by the data presented in the following Table V, a coated film made in accordance with the present invention exhibits oxygen transmission resistance equivalent to the commercially available product but with substantially lower coating weights.

TABLE V

| Coating Weight | Film Samples from Table I | | | |
|---|---|---|---|---|
| | Ex. (2) | Ex. (5) | Ex. (7) | CD-500 |
| gms./1000 in.²/side | 0.79 | 1.40 | 1.98 | 2.17 |
| Total | 1.58 | 2.80 | 3.96 | 4.34 |
| Blocking[1] | | | | |
| gms./inch | 0.5 | 0.4 | 0.6 | 0.8 |
| Haze, %[2] | 1.6 | 2.2 | 2.4 | 4.1 |
| Gloss, %[2] | 100 | 100 | 98 | 90 |
| Coefficient of Friction[3] | | | | |
| Film to Film | 0.18 | 0.19 | 0.18 | 0.24 |
| Oxygen Transmission[4] | | | | |
| cc/100 in.²/24 hrs./1 atm. | 3.8 | 1.8 | 1.2 | 1.7 |

[1]Force required to peel films which had been stored for 3 days at 100° F. 90 % relative humidity under 10 psi pressure.
[2]A.S.T.M. D 2457-65T.
[3]A.S.T.M. D 1894-63.
[4]A.S.T.M. D 1434-66.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A biaxially oriented polypropylene film substrate having a surface coating of a heat sealable composition consisting essentially of an interpolymer of (a) from about 5% to about 15% by weight of a monoethylenically unsaturated acid selected from the group consisting of methacrylic acid and mixtures of methacrylic acid and acrylic acid, (b) from about 50% to about 85% by weight of vinylidene chloride, and (c) from about 5% to about 45% by weight of an alkyl acrylate selected from the group consisting of methyl, ethyl, butyl, isobutyl and octyl acrylates.

2. A thermoplastic film substrate as defined in claim 1 having a surface coating wherein said coating is further characterized by containing from about 0.1% to about 1.0% by weight, based upon the total weight of said interpolymer, of a slip agent consisting of finely divided, water-insoluble particulate material having a particle size of from about 1 to about 5 microns.

3. A thermoplastic film substrate as defined in claim 1 wherein said coating is further characterized by containing a cold slip, anti-blocking material comprising a finely divided wax.

4. A thermoplastic film substrate as defined in claim 6 wherein said finely divided, water-insoluble particulate material consists of a member selected from the group consisting of talc, silica, clay, mica and polyvinyl chloride resin.

* * * * *